United States Patent
Roussel

[11] Patent Number: 5,853,791
[45] Date of Patent: Dec. 29, 1998

[54] PROCESS FOR THE PRODUCTION OF A FOOD INGREDIENT CONSTITUTED ESSENTIALLY OF MUSCULAR PROTEIN FIBERS

[75] Inventor: Hervé Roussel, Bouchemaine, France

[73] Assignee: Protial, Societe Anonyme, Beaucouze, France

[21] Appl. No.: 734,917

[22] Filed: Oct. 22, 1996

[30] Foreign Application Priority Data

Aug. 2, 1996 [FR] France .................................. 96 09803

[51] Int. Cl.$^6$ ....................................................... A23L 1/31
[52] U.S. Cl. .......................... 426/646; 426/641; 426/643
[58] Field of Search .................... 426/646, 645, 426/641

[56] References Cited

U.S. PATENT DOCUMENTS

| | | | |
|---|---|---|---|
| 3,062,655 | 11/1962 | Staackmann | 426/645 |
| 3,551,535 | 12/1970 | Henderson | 426/641 |
| 3,552,978 | 1/1971 | Inklaar | 426/641 |
| 3,934,050 | 1/1976 | Hawkins | 426/645 |
| 4,060,642 | 11/1977 | Suzuki | 426/646 |
| 4,123,557 | 10/1978 | Epstein | 426/646 |
| 4,210,677 | 7/1980 | Huffman | 426/641 |
| 4,377,597 | 3/1983 | Shapiro | 426/641 |
| 4,450,183 | 5/1984 | Steinberg | 426/646 |
| 4,880,654 | 11/1989 | Okady | 426/646 |
| 4,999,204 | 3/1991 | Gibson | 426/646 |
| 5,221,554 | 6/1993 | Gamay | 426/646 |

OTHER PUBLICATIONS

Whitaker 1977 Food Proteins p. 127 AV1 Publishing Co. Inc Westport CT.

*Primary Examiner*—Carolyn Paden
*Attorney, Agent, or Firm*—Young & Thompson

[57] ABSTRACT

A process for the production of a natural and gelling food ingredient constituted by proteins of muscular fibers from red meat muscular flesh or muscular flesh of fish, crustacea, mollusks, or cephalopods. The process comprises subjecting the flesh to a gentle destructuring which does not damage the muscular fibers, continuously mixing the muscular flesh thus destructured with a predetermined volume of water, the mixture leaving at a predetermined temperature, adjusting the temperature of the mixture to at least one precisely predetermined temperature, subjecting the mixture thus thermally treated to fractionation centrifugally or by mechanical pressure, and rapidly cooling the recovered solid phase to a temperature below 10° C.

6 Claims, 2 Drawing Sheets

PROCESS FOR THE PRODUCTION OF A FOOD INGREDIENT CONSTITUTED ESSENTIALLY OF MUSCULAR PROTEIN FIBERS

FIELD OF THE INVENTION

The invention relates to a new process and a new installation for the production of a natural and gelling food ingredient constituted of proteins of muscular fibers of the meat of cattle, sheep, swine or poultry (chickens, turkey, ducks, rabbit, . . . ), of muscular flesh of fish, crustacea, mollusks or cephalopods. The invention also relates to the food ingredients obtained by this process and the food preparations containing them.

BACKGROUND OF THE INVENTION

This new food ingredient can be present in different forms, mostly wet (10 to 60% dry material), but also dehydrated (85 to 100% dry material). It can also be mixed with a food support, which is to say a secondary food ingredient such as maltodextrin, starch, etc. so as to facilitate its drying (by spraying for example) or its food usage (wettability, dispersibility, etc.). This secondary mixture does not depart from the original nature of the invention. The storage stability of the new ingredient is ensured by freezing, drying or thermal treatment, and that without loss of the gelling and water retention properties which characterize it. In the case of stabilization by thermal treatment, a UHT treatment, which is to say heating at high temperature for a short time, is used directly continuously during production of the ingredient so as to ensure so-called "practical" pasteurization or sterilization. The use of this UHT thermal treatment, completely controlled in terms of temperature and duration, is thus an integral part of the present invention.

The flesh of beef, mouton, pork, poultry, but also fish, crustacea, mollusks and cephalopods, is structured about common biochemical constituents forming the skeletal muscle. Three distinct classes of proteins are present in this muscle in various proportions: the sarcoplasmic proteins soluble in water (about 30 to 40%) constituted essentially of hemoglobin, myoglobin and albumin, the proteins of conjunctive tissue insoluble in water (content variable according to the muscle, but frequently of the order of 10 to 20%) constituted essentially by collagen and elastin, and the myofibrillary contractile proteins insoluble in water and soluble in saline solutions (about 50%) constituted essentially of myosin and actin.

It is the myofibrillary contractile fraction which is present in the muscular fibers, and more particularly the protein myosin, which is the gelling agent responsible for gels of meat, poultry and seafood (in the case of surimi gel, for example). When the muscle is maculated in the presence of salt, this fraction is partially extracted and the protein solubility increases. When the salted mixture is cooked, these proteins reorganize in a homogeneous and gelled matrix capable of retaining a great deal of water (water retention property) and the fatty materials (property of retaining fatty materials). The conjunctive tissue proteins are also a portion of the final gel, but to a lesser degree and only during cooling. The sarcoplasmic proteins are often expelled from the matrix and coagulate in a heterogeneous manner in the form of a fairly soft and grayish cooked protein paste.

The present invention relates to the production of a new food ingredient in which the myofibrillary protein fraction is preponderant and is not denatured. In this ingredient, the myofibrillary proteins are again organized in the form of partially destructured muscular fibers. The myofibrillary proteins are not on the contrary in any case dissociated in the form of an unorganized protein solution, which solution is sometimes called a "sol". They are present in the form of partially integrated muscular fibers and, in this sense, the protein ingredient which is the object of the present invention can be assimilated into an extract of muscular fibers.

As set forth above, the sarcoplasmic proteins have poor gelling properties. To a certain degree, they even prevent the complete expression of the gelling properties and of the water retention power of the fatty materials of the myofibrillary proteins. To produce a food ingredient based on myofibrillary proteins, it is necessary to depart from the sarcoplasmic proteins. To do that, there exists two possible scientific and technological paths: extraction of the myofibrillary proteins, or extraction of the sarcoplasmic proteins.

The first path is the object for example of the industrial production of a product called ISOPROM in Poland (T. Trziszka et al., April 1993). The authors use poultry meat separated mechanically (VSM in French, MRM or MDM in English). This meat from the carcasses after cutting up is fatty (about 16% of fatty materials) and colored because of the presence of large quantities of blood pigment. The first step consists in mixing in the VSM in soft water containing calcium salt (a ratio of water/VSM=4; final content of calcium chloride=1.5%). This high saline concentration has for its effect to place in solution the myofibrillary proteins of the muscle. The mixture is then centrifuged, which results in separation on the one hand of the liquid containing the sarcoplasmic proteins and the myofibrillary proteins, and on the other hand a wet protein sludge containing the support proteins (principally collagen). The liquid phase is then diluted ten times in conical vats to reduce the saline concentration and to cause to precipitate the myofibrillary proteins. These latter, which have once again become insoluble, are recovered by a further centrifugation with the aid of a centrifugal separator with plates. The soluble sarcoplasmic proteins are then eliminated. The ISOPROM is finally present in the form of a very moist clear beige paste (88–90% liquid) constituted essentially of myofibrillary proteins. In this sense, it should be considered a true isolate of purified myofibrillary proteins (about 90% of the total proteins). The muscular fibers are no longer visible under microscopic observation. The ISOPROM can then be frozen or dried and it has good functional properties, particularly gelling. Because of the centrifugal methods used, it is also defatted (to less than 2% of fatty materials) and its color is suitable (elimination of blood pigments: hemoglobin and myoglobin). This technological path is interesting to obtain well purified myofibrillary proteins. It has the drawback of giving a low technical yield, of the order of 50% on a wet basis, but with a dry material content of only 10–12%. A large part of the myofibrillary proteins is lost with the support proteins. This technological path corresponds in fact to that which is now used for laboratory researchers for the extraction and purification of myofibrillary proteins. In this connection, there should be mentioned the work of the team of INRA of Theix in France on the gelling properties of bovine myofibrillary proteins also extracted by the saline path (CULIOLI et al., V.P.C., 11, 313–314).

The second technological path consists in eliminating the sarcoplasmic proteins by extraction with water, thus using their property of solubility in this solvent. The best known process using this principle is the surimi production principle from fish muscle. Thus, known from the 15th century in Japan, the technique consisting in quenching minced fish fillets in cold soft water (less than 10° C.) has been developed and is used up to the present. The worldwide production of fish surimi amounts nowadays to annual volumes of the order of 700,000 tons. The production of surimi does not consist only in extraction of sarcoplasmic proteins in water. It corresponds also to the elimination of proteins of the conjunctive tissue (here the leftover bones and skin) by a so-called "refining" operation (operation identical to screening in red fruit industries) and moreover includes a major innovation which consists in cryoprotecting the myofibrillary proteins by the addition of sugar and polyphosphates. Nevertheless, apart from these two essential points, the washing cycle with cold water of the fish flesh followed by centrifugal dewatering (normally 2 to 3 consecutive cycles) permits an almost complete elimination of the sarcoplasmic proteins. Before addition of cryoprotective agents, this washed and "refined" protein paste is in fact also a wet concentrate of myofibrillary proteins (about 80% of the total proteins), but the fibrous structure of the muscle no longer exists. The muscular fibers have been destructured during the refining operation. It should nevertheless be mentioned that the surimi of fish does not exist as such unless it combines the washing/dewatering cycles, the refining and the addition of cryoprotective agents before freezing (Surimi Technology, Marcel Dekker Inc., 1992, 528 pp.).

Various other treatments of the meat or fish byproducts can be mentioned in this connection. Among these for example are continuous defatting processes for meat, and particularly defatting of VSM by the centrifugal method. These techniques are being developed for various purposes, leading to the production of meat flour for animal feed (U.S. Pat. No. 4,137,335) and to the production of defatted meats for dietetic use, low in cholesterol (U.S. Pat. No. 4,980,185). The separation of fat from meat can be carried out according to three distinct paths. The first consists in mechanical separation by pressing, slicing or scraping fatty pieces (U.S. Pat. Nos. 4,776,063; 3,780,191; 3,685,095 and 3,748,148; French patent 2.187.229). The second uses physical treatments such as heat, radiation or gas (U.S. Pat. Nos. 4,778, 682; 3,687,819; 3,780,075 and 3,532,593). Finally, the third corresponds to the action of chemical solvents for the extraction of fat (U.S. Pat. Nos. 3,794,743 and 3,532,593).

U.S. Pat. No. 3,177,080 discloses a system permitting degreasing beef or pork meat which is too fatty, by centrifugation after cooking and mechanical destructuring. The recovered meat fraction is subjected to severe and long thermal treatment with steam, giving rise to the total denaturation of the muscle proteins. These latter no longer have useful food functional properties. A particular case is that of U.S. Pat. No. 5,382,444 filed by the Oscar Major Food Corp. In this, the process developed is similar to the preceding, but the temperatures used are low and thus do not give rise to total denaturation of the meat proteins. The author indicates that the beef, pork or turkey meat, thus defatted at low temperature, contains of the order of 2 to 8% of fatty material, 17 to 22% of protein and liquid of the order of 72 to 75%. It is well to note that the process does not correspond to fractionation of the different classes of muscular protein. The sarcoplasmic, collagenic and myofibrillary proteins are contained in their original condition in the defatted meat according to this invention. As is stated in this text, the functional properties of this defatted meat are superior to those of the same non-defatted meat. This is logical to the extent that it is known that the fatty materials, like the sarcoplasmic proteins, impede the complete gelling of myofibrillary proteins.

SUMMARY OF THE INVENTION

The present invention seeks to obtain on an industrial scale, which is to say by a continuous production process, a new food ingredient constituted essentially of animal protein fibers which are not denatured in the course of the process of production, and particularly with a high proportion (of the order of 70 to 80%) of myofibrillary proteins insoluble in water.

To this end, according to a first characteristic, the invention has for its object a process for the production of a natural and gelling food ingredient constituted of proteins of muscular fibers based on red meat muscular flesh or the muscular flesh of fish, crustacea, mollusks or cephalopods, characterized in that:

a) the flesh is subjected to gentle destructuration which does not damage the muscular fibers, b) the muscular flesh thus destructured is continuously mixed with a precise volume of water, the mixture leaving at a predetermined temperature (T1), c) the temperature of the mixture is adjusted to at least one predetermined precise temperature (T2, T3), d) the mixture thus thermally treated is subjected to fractionation centrifugally or by mechanical pressure and, e) the solid phase recovered is subjected to rapid cooling at a temperature (T4) lower than 10° C.

According to a preferred embodiment of the process according to the invention, the predetermined precise temperature applied to the mixture of flesh and water is selected in value and in duration to correspond to a UHT thermal treatment.

According to one embodiment of the invention, there is introduced into the mixture of flesh and water at least one additive adapted to promote the operation of fractionation and/or to improve the functional and/or nutritional properties of the food ingredient.

There can also be practiced, either before the operation of fractionation in the case of a process by the wet path, or on the final product after fractionation, an operation of refining by screening.

Moreover, it can be provided that the process is preceded or followed by at least one complementary technological treatment known per se adapted to modify the functional and/or nutritional properties of the ingredient, in particular successive treatments of washing and drying.

The invention also has for its object an installation for the practice of the preceding process, as well as the food ingredients obtained by this process and the food preparations containing such ingredients.

BRIEF DESCRIPTION OF THE DRAWINGS

The invention will be better understood from a reading of the following description and examples of embodiment, with reference to the accompanying drawings, in which.

DETAILED DESCRIPTION OF THE INVENTION

Figure 1:
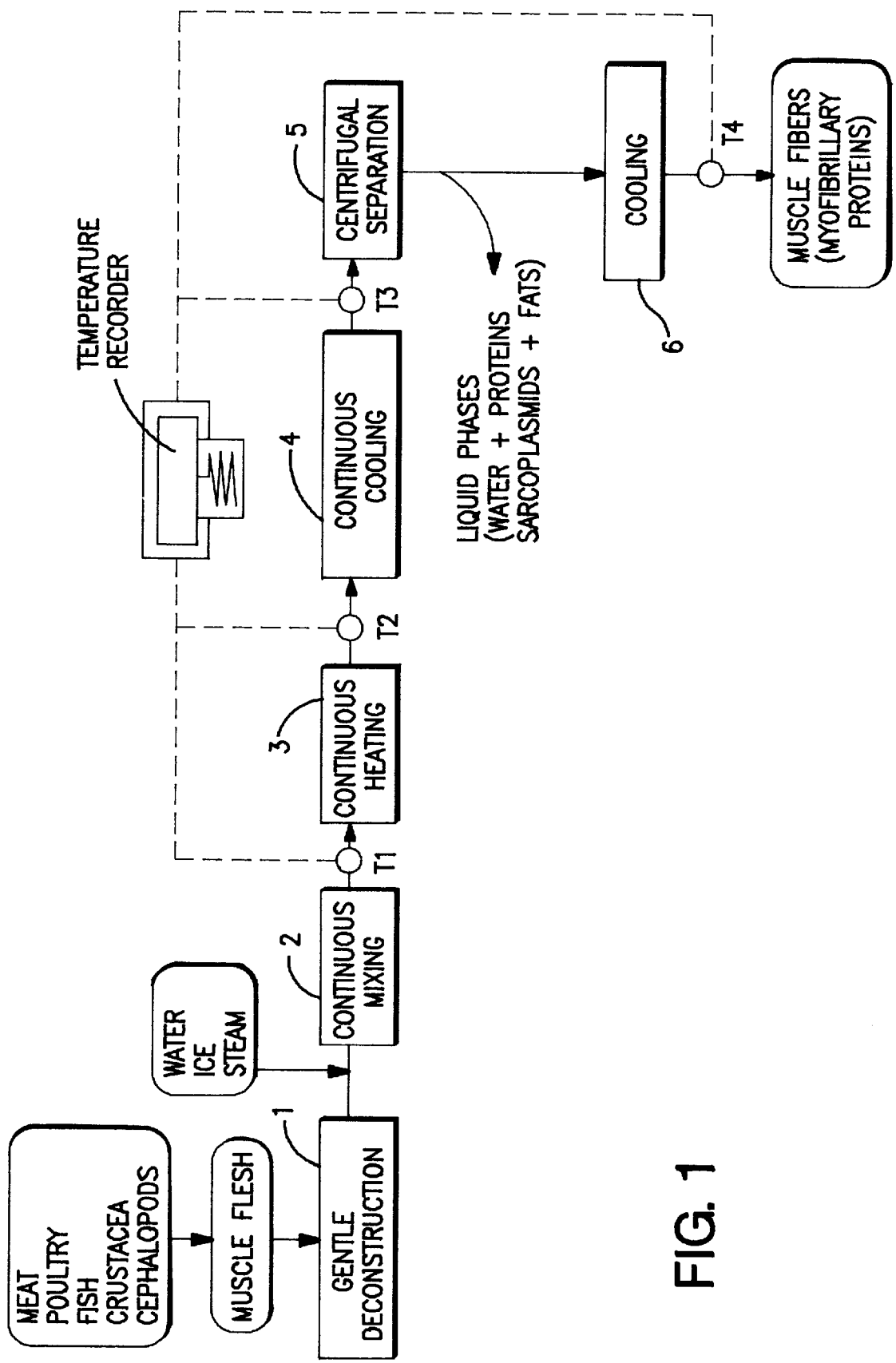
FIG. 1 is a schematic view showing an example of the practice of the process of the invention.
Figure 2:
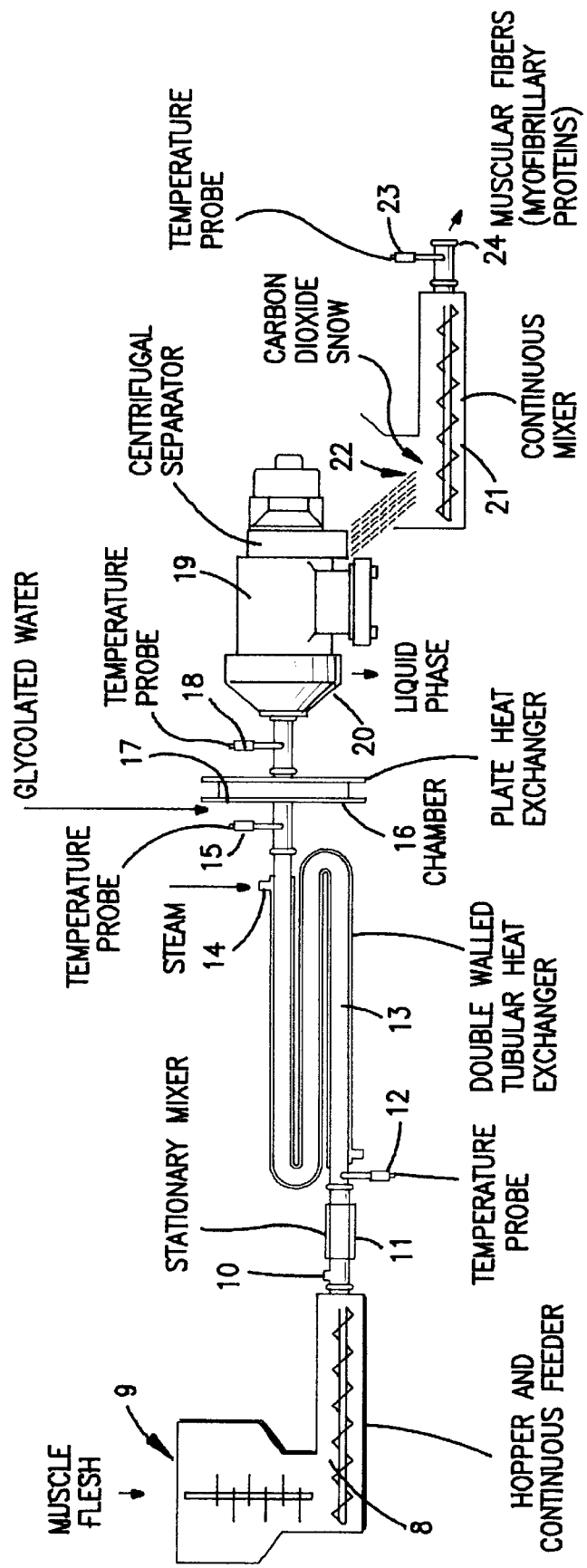
FIG. 2 shows schematically an installation for the practice of the process.

The process and product according to the present invention are distinguished from known processes and products because the technological operation of production is oriented toward the only partial elimination of the sarcoplasmic protein fraction and a portion of the fat, and this without complete destruction of the muscular fibers. FIGS. 1 and 2 show schematic views of the process and an example of the device to use it, respectively. Tables 1 and 2 assemble, by way of example, the principal operative conditions (temperature and time) associated with the invention.

The muscular flesh of beef, mouton, pork, poultry, but also fish, crustacea, mollusks, and cephalopods, generally available at a core temperature below 10° C., is coarsely destructured so as not to damage the muscular fibers. This operation must be carried out without excessive heating which contains the fatty material and the water added to the initial mixture, in which are entrained most of the sarcoplasmic proteins of the muscle.

TABLE 1

CONTROL TEMPERATURES OF THE INVENTION

| CONDITION | STATE OF COOKING FINAL PRODUCT | TYPE | INITIAL TEMPERATURE OF THE PRODUCT | TEMPERATURES IN THE COURSE OF THE PROCESS | | | |
|---|---|---|---|---|---|---|---|
| | | | | T1 | T2 | T3 | T4 |
| a | raw | standard | −5 to 10° C. | 2 to 15° C. | 15 to 45° C. | 15 to 45° C. | −5 to 10° C. |
| b | cooked | UHT pasteurized | −5 to 10° C. | 2 to 15° C. | 65 to 95° C. | 15 to 45° C. | −5 to 10° C. |
| c | | UHT sterilized | −5 to 10° C. | 2 to 15° C. | 110 to 130° C. | 15 to 45° C. | −5 to 10° C. |
| d | | UHT sterilized | −5 to 10° C. | 65 to 130° C. | 110 to 130° C. | 15 to 45° C. | −5 to 10° C. |
| e | | UHT pasteurized | −5 to 10° C. | 65 to 95° C. | 65 to 95° C. | 65 to 95° C. | −5 to 10° C. |

(heating tolerated by 1° to 3° C. maximum at the core). The flesh thus destructured is then continuously mixed with a precise volume of water. This water content can be effected in the form of liquid, solid (ice, ice slush) or gas (vapor). The ratio (water/flesh) is generally comprised between 0.5 and 6. The temperature of the mixture (water+flesh) at the outlet of the mixing zone corresponds to the temperature T1. Then, the temperature of the mixture (water+flesh) is adjusted precisely to the temperatures T2, then T3, T3 being adapted to be equal to T2 and T1 in certain particular cases of the invention (see below). The exact adjustment of the temperatures T2 and T3 is essential to permit the fractionation of the heavy liquid phases, light liquids and solids during the following step of the invention. In the case of the UHT thermal treatment, which is one of the original conditions of the invention, the temperature T2 is maintained constant for an exact duration to guarantee a destruction of the pathogenic bacteria of reference in vegetative or sporulated form. For example, the practical pasteurization is guaranteed by a destruction of $10^{12}$ to 1 of the number of vegetative cells of *Streptococcus feacalis* and the practical sterilization is guaranteed by the destruction of $10^{12}$ to 1 of the number of spores of *Clostridium botulinum*. The heating processes associated with temperatures T2 essentially, T3 secondarily, can be either heating with warm water or with steam, by direct or indirect contact (heat exchanger with plates, tubular, roughened surface, etc.), by double envelope with an oil bath, by induction, microwaves, joule effect, dielectric effect, etc. The cooling processes associated with temperatures T3 and T4 essentially, T2 secondarily, can be either indirect cooling with water or by a cold solution (brine, mulicolated water, . . . ) by means of a traditional heat exchanger, even also a cooling by direct contact in a continuous mixer with cryogenic gas such as liquid nitrogen or carbon dioxide in the form of carbon dioxide snow. The advantage of the double system of thermal regulation of the process is to permit regulation with high precision of the temperature T3 by an adjustment of the warm/cold type. The mixture (water+flesh) thus thermally treated is then fractionated into at least two parts by the centrifugal method, preferably by centrifugal decantation rather than by plates centrifugal separators or with nozzles or even by mechanical pressure, preferably by a screw press. The first portion corresponds to the solid phase of the mixture. It contains the muscular fibers and constitutes the protein matrix of the ingredient which is the object of the invention. It is a matter principally of myofibrillary proteins and the proteins of the conjunctive tissue. The second portion is the liquid phase

TABLE 2

CONTROL TIMES OF THE INVENTION

| CON-DITION | TYPE | DURATION OF THERMAL TREATMENT (in seconds maintained at Tn at the core) | | | |
|---|---|---|---|---|---|
| | | T1 | T2 | T3 | T4 |
| f | standard | 60 to 1800 s | 60 to 300 s | 60 to 300 s | 60 s |
| g | UHT | 5 s | 5 s | 60 to 300 s | 60 s |
| h | UHT | 60 to 1800 s | 5 s | 60 to 300 s | 60 s |
| i | standard | 5 s | 60 to 300 s | 60 to 300 s | 60 s |

The solid phase constitutes the protein ingredient relative to the present invention. This wet protein ingredient is then rapidly cooled to below 10° C. and can be kept several hours thus so as to be used in a conventional food application of the delicatessen, prepared plates or other products. It can also be stored fresh in a thermosealed plastic bag, in the presence or not of a modified atmosphere to ensure its preservation. It can be frozen in a deep freezer with plates, a pulsed air tunnel or by contact with a cryogenic fluid. It is also possible to cryoprotect it in the manner of a fish surimi. Its functional properties will thus be maintained for a long time. It could also be ionized at the frozen state to improve further its microbiological quality. Finally, the wet protein ingredient can be dehydrated according to different conventional techniques (hot air, spraying, lyophilization, . . . ), with or without a support. In the case in which the process includes a UHT thermal treatment, an aseptic storage system defined according to the regulations in force permits guaranteeing the pasteurization or the sterility of the ingredient and hence its storage at ambient temperature for several months. In this latter case, one of the novel points of the invention has to do with the fact that the myofibrillary proteins have not been denatured by the UHT process, and hence have preserved at least 80% of their original gelling property.

EXAMPLES

Example 1 can be considered as being a standard case. It is constituted by the following unitary technological operations (see the scheme of FIG. 1, associated with temperature conditions (a) and treatment time (f) shown in Tables 1 and 2): coarse and gentle destructuration (1) of the muscular flesh in a cutter or a mincer to a granulometry of the order of 1 to 5 millimeters diameter, continuous addition (2) of a quantity of refrigerated water (ratio water/flesh of 2/1), intimate mixture by gentle agitation so as not to destructure the muscular mass and to reach the temperature T1, passage (3) and (4) into two tubular exchangers (the first (3) is heated to the temperature T2, the second (4) is cooled to reach the temperature T3) to adjust precisely the temperature of the mixture to T3=35° C., centrifugal decantation in an apparatus of the Westfalia Separator CA 220-03 type, recovery of the solid phase and rapid cooling (6) in a continuous mixture with aspersion of carbon dioxide snow, forming into plates of exactly 7.5 to 10 kg by a screw press (each plate is surrounded by a plastic pocket), freezing in a quick freezer with plates for two hours and a half, emplacement in cartons, frozen storage. The operations described in this example can be practiced on the flesh of beef, mouton, pork, poultry, fish, crustacea, mollusks, or cephalopods. In this example No. 1, the final product of the invention is hence a wet protein ingredient (70 to 85% moisture) and raw (whose dry material is essentially constituted of molecular fibers (which is to say more than 80% of myofibrillary proteins and of proteins of the support tissue) and only 25 to 50% of the initial sarcoplasmic proteins. Thus, about 50 to 75% of the sarcoplasmic proteins soluble in water and at least 50% of the initial fat have been eliminated in the course of centrifugal treatment. Table 3 shows the yields and the biochemical compositions of the initial muscle and of the extract of muscular fibers prepared from various initial materials of red meat origin.

Example 2 corresponds to use of the invention with the turkey flesh. It corresponds to the same figure and tables, but this time the conditions of duration of thermal treatment differ. They are adjusted according to conditions (g) in Table 2, which is to say that the unit operations of mixing (2) and heating (3) are carried out in the so-called "flash" manner, namely for a duration of several seconds. This technique requires the use of a turbomixer or of a so-called "static" mixer. The thermal treatment is carried out with a conventional exchanger (tubular, plate, etc.) or by means of an electrical apparatus such as a tube for current passage, an ohmic or microwave system, etc. FIG. 2 shows such a device used to practice the invention. The functional properties of the muscular fibers of poultry thus gathered are maximal, 3 to 5 times greater than those of the initial flesh. The nutritional quality of the ingredient is raised, as shown by the profile of amino acids in Table 4. In the particular case in which the mixture (flesh+water) is subjected to a thermal treatment of the UHT type under conditions (b), (c), (d) or (e) of Table 1 guaranteeing a "practical pasteurization" or a "practical sterilization", the proteins of muscular fiber maintain at least 80% of the gelling properties of the extract of muscular fibers that are not thermally treated, expressed as resistance of the gel measured by penetrometry (rupture of the gelled network with a spherical probe 3 mm in diameter). The final centrifugal separation is carried out preferably at a relatively low temperature T3 less than 45° C.

TABLE 3

COMPOSITION OF THE UNDRIED INGREDIENT AND PRODUCTION YIELD ACCORDING TO THE INVENTION

| | | Yield % | Moisture % | Proteins % | Lipids % | Collagen % | Col./Prot. % |
|---|---|---|---|---|---|---|---|
| BEEF | | | | | | | |
| INITIAL | bones and all | 100 | 50.1 | 13.1 | 35.6 | 0.7 | 5.0 |
| MUSCLE | aponeurosis | 100 | 67.5 | 22.6 | 8.4 | 7.0 | 30.9 |
| | jowl | 100 | 72.0 | 21.1 | 7.0 | 4.7 | 22.2 |
| FIBERS | bones and all | 47.3 | 78.4 | 19.0 | 1.6 | 1.1 | 5.9 |
| according to the | aponeurosis | 64.9 | 73.1 | 23.0 | 3.4 | 6.4 | 27.9 |
| invention | jowl | 59.8 | 72.9 | 18.9 | 3.4 | 4.2 | 22.3 |
| PORK | | | | | | | |
| INITIAL | round bone | 100 | 61.9 | 15.8 | 20.5 | 1.2 | 7.8 |
| MUSCLE | flat bone | 100 | 62.2 | 16.6 | 20.6 | 2.6 | 15.5 |
| FIBERS | round bone | 56.1 | 75.7 | 15.8 | 7.7 | 3.2 | 20.2 |
| according to the | flat bone | 57.6 | 78.7 | 18.9 | 1.6 | 1.5 | 7.9 |
| invention | | | | | | | |
| TURKEY | | | | | | | |
| INITIAL | chest | 100 | 67.0 | 14.4 | 14.0 | 1.2 | 8.3 |
| MUSCLE | neck | 100 | 73.4 | 14.8 | 10.4 | 1.3 | 8.8 |
| FIBERS | chest | 61.6 | 77.8 | 15.5 | 2.5 | 2.9 | 18.7 |
| according to the | neck | 52.3 | 77.9 | 17.0 | 1.5 | 4.2 | 24.7 |
| invention | | | | | | | |
| CARP | | | | | | | |
| INITIAL | filet | 100 | 82.6 | 14.1 | 2.75 | — | — |
| MUSCLE | dressing | 100 | 82.5 | 10.4 | 6.3 | | |
| FIBERS | filet | 46.3 | 74.7 | 20.0 | 1.5 | — | — |
| according to the | dressing | 36.2 | 79.3 | 17.2 | 3.4 | | |
| invention | | | | | | | |

TABLE 4

EXAMPLE OF COMPOSITION OF AMINO ACIDS OF THE EXTRACT OF MUSCULAR FIBERS ACCORDING TO THE INVENTION APPLIED TO TURKEY MUSCLE

| TOTAL AMINO ACIDS | RESULTS (g/100 g of product) |
| --- | --- |
| Lysine | 1.90 |
| Histidine | 0.54 |
| Arginine | 1.42 |
| Aspartic acid | 2.25 |
| Threonine | 1.00 |
| Serine | 0.90 |
| Glutamic acid | 3.37 |
| Proline | 0.82 |
| Glycine | 1.00 |
| Alanine | 1.32 |
| Cysteine | 0.18 |
| Valine | 1.02 |
| Methionine | 0.48 |
| Isoleucine | 1.03 |
| Leucine | 1.68 |
| Tyrosine | 0.77 |
| Phenylalanine | 0.91 |
| Tryptophane | 0.15 |
| TOTAL | 20.74 |

Example 3 can be the practice of the invention with fish flesh, in this instance fillet of common carp. In this case, the preferred operative parameters correspond to conditions (a) and (f) of Tables 1 and 2. The yield of the process is indicated in Table 3, as well as the composition of the initial and final materials. Certain functional properties such as loss of water upon thawing, loss of water upon cooking, gelling power, as well as the parameters of color, are shown in Table 5. As will further be seen, the functional properties of the extract of fibers, in particular the gelling power, are much better than those of the initial muscle. In this case again, there will be seen a strong clarification of the material treated (luminance parameter L* improved by 17 units).

TABLE 5

FUNCTIONAL PROPERTIES OF MUSCLE OF COMMON CARP AND OF THE EXTRACT OF DERIVED MUSCULAR FIBERS PREPARED ACCORDING TO THE INVENTION

| | LOSS OF WATER UPON THAWING (%) | LOSS OF WATER UPON COOKING (%) | COLOR | | | TEXTURE | |
| --- | --- | --- | --- | --- | --- | --- | --- |
| | | | L* (%) | a* | b* | f. rupt. (gf) | d. rupt. (mm) |
| MUSCLE OF COMMON CARP | 21.3 | 19.0 | 44.4 | 27.9 | 9.6 | 106.8 | 4.9 |
| EXTRACT OF MUSCULAR FIBERS | 2.3 | 26.8 | 61.3 | 9.4 | 8.1 | 210.6 | 9.4 |

As a result, the present invention has for a characteristics a process for the continuous production of a new food ingredient most often in moist form (65 to 90% moisture) and frozen, constituted essentially of animal muscular protein fibers, which is to say cattle, sheep, swine, poultry (chicken, turkey, duck, rabbit, . . . ), of fish or other products (crustacea, mollusks, cephalopods, . . . ) from the sea and from aquaculture. These fibers, which are not destructured in the course of the process, are comprised by 70 to 80% of myofibrillary proteins insoluble in water. They are derived, from fresh muscle, by an extraction with water by centrifugation alone, from the other muscular proteins which are the soluble sarcoplasmic proteins and initial fat. This extraction is carried out most often with 0.5 to 5 volumes of water per volume of initial muscular flesh (the invention comprises a system of fine thermal regulation permitting adjusting the temperature of the mixture (water+flesh) by about 1° C. between 15° and 130° C. just before centrifugation. The same system permits the control of the thermal treatment temperature to within 2 seconds, which permits the thermal treatment time to be from 5 to 300 seconds. The invention thus permits extracting muscle fibers in hydrated form, raw form or having been subjected to a UHT cooking treatment, or to pasteurization or sterilization.

The ingredient produced according to this process is an extract of muscular fibers constituted essentially by the muscular protein fraction now known as "myofibrillary proteins" or "actomyosine" and which possesses good functional properties with respect to the initial muscular material, particularly a gellifying power 2 to 5 times greater, expressed in terms of the resistance to force of the gel measured by penetration of a spherical reference probe. This extract is obtained by partial elimination of the muscular protein fraction known as "sarcoplasmic proteins" and of a majority of the fatty materials that may be present. The process according to the invention does not give rise to the total destruction of the fibrous structure of the muscle as is the case in the process for production of concentrates, isolates or surimi from muscle. The elimination of the fatty materials during the process of production is a supplemental benefit which confers on the new ingredient obvious dietetic and nutritional properties. This point is also reinforced by an aminogram rich in essential amino acids. The process permits also a clarification of the color and neutralization of the taste of the ingredient relative to the initial muscular flesh. The new ingredient is thus particularly well adapted for the preparation of foodstuffs in delicatessen, cooked plates, salads, breaded and/or filled products, etc.

In one embodiment, the ingredient is in moist form and contains added cryoprotective agents of the type of those used for fish surimi, namely mixtures of glucides such as saccharose, glucose, fructose, mannitol, sorbitol, etc., and if desired polyphosphate foodstuffs, sucro-esters, organic acids, salt, etc. The most usual cryoprotective mixture is a mixture of 48% saccharose, 48% sorbitol and 4% sodium polyphosphate. The ratio of incorporation of the cryoprotective mixture in the moist ingredient, just before freezing, can vary from 5 to 10%.

According to a modification, the ingredient is partially dehydrated (paste concentrated to 30–50% moisture) or totally (powder with 3–10% moisture) according to conventional means (spraying, hot air tunnel, drying cylinder, etc.) or not (lyophilization, osmotic dehydration, drying under vacuum, etc.).

Preferably, this ingredient is textured, which is to say that it is subjected to a physical, chemical and/or biological restructuring treatment so as to give it an irreversible macroscopic structure imparting to it the volume or appearance of muscle. The final texture obtained can correspond to a presentation in the form of granules of different sizes, flakes, strips, cubes, rectangles, irregular pieces, large pieces. It can be uniform, random, expanded, lamellar, pseudo-fibrous or actually fibrous. The technologies permitting texturization of this ingredient are, among others, gelling, coagulation, forming, extrusion, cooking-extrusion, chemical or biological polymerization, drawing, scarification, granulation, etc. The textured product made from the ingredient that is the object of the invention can contain other food ingredients without departing from the scope of the invention. The textured product can be dried according to the techniques described above.

In one embodiment of the invention, it is provided that a secondary additive is introduced into the mixture (water+ flesh) to promote the operation of extraction or to improve the final functional or nutritional properties of the ingredient. Among the potential additives are: salt (NaCl), sodium bicarbonate, calcium chloride ($CaCl_2$), citric acid, etc.

There can also be provided, either before centrifugal separation (wet bath), or on the final product after centrifugal separation, a refining operation, which is to say screening of the extract of muscular fibers through a screen with perforations of the order of 0.5 to 2 mm diameter.

Moreover, the process can be preceded or followed by any complementary technological operations adapted to modify the functional or nutritional properties of the ingredient, in particular successive treatments by washing and drying according to the process of producing fish surimi.

The installation for practicing the process according to the invention comprises a gentle destructuring apparatus, such as a continuous hopper and continuous feeder 8 with an inlet 9 for muscular flesh.

At the outlet of apparatus 7 is connected a water supply 10, the assembly being connected to a static mixer 11. The outlet of mixer 11, to which is connected a probe 12 for measuring the temperature T1, opens into a heating device 13 and a temperature T2, for example a double walled tubular heater exchanger comprising a steam inlet 14. A probe 15 measures the temperature T2 at the outlet of the device 13, this outlet opening into a cooling apparatus 16, for example a plate heat exchanger comprising a glycolated water inlet 17. A probe 18 measures the temperature T3 at the outlet of the apparatus 16, which opens into a centrifugal fractionating apparatus 19, for example a centrifugal decanter comprising an outlet 20 for the liquid phase or an endless screw press. The solid phase is sent to a continuous mixer 21 provided with an inlet 22 for carbon dioxide snow. A probe 23 measures the temperature T4 at the outlet 24 of the mixer 21 by which the ingredient according to the invention leaves. The heat exchanger 16 can be completed by a second exchanger. The operation of fractionation obtained by centrifugation can also be carried out by a mechanical pressing, for example with the aid of a screw press.

The device described above is one example of embodiment of the invention particularly developed. The invention is in no way avoided if one or all of the unit operations constituting it are carried out by simpler apparatus, particularly a system of vats and pumps.

The invention also comprises feed compositions including at least one ingredient according to the invention.

What is claimed is:

1. A process for the production of a natural and gelling food ingredient constituted by proteins of muscular fibers from red meat muscular flesh or muscular flesh of fish, crustacea, mollusks, or cephalopods, comprising:

a) subjecting the muscular flesh to a gentle destructuring to obtain particles having a size of not less than 1 mm in order not to damage the muscular fibers, b) continuously mixing the muscular flesh thus destructured with a predetermined volume of water for a period of 5 to 1800 seconds to obtain a mixture having a temperature in the range of 2° to 15° C., c) thermally adjusting the temperature of the mixture to at least one precisely predetermined temperature in the range of 15° to 45° C., and maintaining the mixture at said predetermined temperature for a period of 60 to 300 seconds, d) subjecting the mixture thus thermally treated to fractionation centrifugally or by mechanical pressure so as to recover a solid phase, and e) rapidly cooling the recovered solid phase for a period of about 60 seconds to a temperature below 10° C. to produce a natural and gelling food ingredient that contains 70% to 80% myofibrillar protein fibers which are not denatured.

2. Process according to claim 1, further comprising thermally adjusting the temperature of the mixture between steps b) and c) to a predetermined temperature in the range of 65° C. to 130° C., and maintaining it at this temperature for a time sufficient to provide a pasteurized or sterilized thermal treatment.

3. Process according to claim 1, further comprising introducing into the mixture of muscular flesh and water at least one additive adapted to promote the fractionation operation and to improve the functional and nutritional properties of the food ingredient.

4. Process according to claim 1, further comprising at least partially dehydrating the food ingredient obtained.

5. Process according to claim 1, further comprising refining said food ingredient by screening the product of step (c) or the product of step (d).

6. Process according to claim 1, further comprising repeating steps (b) to (d) in successive treatments of washing and draining to modify the functional and nutritional properties of the ingredient.

* * * * *